(12) United States Patent
Matsui

(10) Patent No.: US 10,090,493 B2
(45) Date of Patent: Oct. 2, 2018

(54) CELL MODULE

(71) Applicant: TOYOTA JIDOSHA KABUSHIKI KAISHA, Toyota-shi, Aichi-ken (JP)

(72) Inventor: Keita Matsui, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 97 days.

(21) Appl. No.: 15/435,623

(22) Filed: Feb. 17, 2017

(65) Prior Publication Data

US 2017/0244074 A1   Aug. 24, 2017

(30) Foreign Application Priority Data

Feb. 23, 2016   (JP) .................................. 2016-032471

(51) Int. Cl.
  *H01M 2/00* (2006.01)
  *H01M 2/10* (2006.01)
(52) U.S. Cl.
  CPC ................................... *H01M 2/105* (2013.01)
(58) Field of Classification Search
  CPC ....................................................... H01M 2/105
  See application file for complete search history.

(56) References Cited

U.S. PATENT DOCUMENTS

| | | | |
|---|---|---|---|
| 5,521,022 A * | 5/1996 | Petzl | H01M 2/105 429/100 |
| 8,945,796 B2 * | 2/2015 | Maeda | H01M 8/0232 429/483 |
| 2018/0040862 A1 * | 2/2018 | Yi | H01M 2/105 |

FOREIGN PATENT DOCUMENTS

| | | |
|---|---|---|
| JP | 2012-221844 A | 11/2012 |
| JP | 2013-008638 A | 1/2013 |
| JP | 2015-095594 A | 5/2015 |
| JP | 2016-012415 A | 1/2016 |
| JP | 2016-012416 A | 1/2016 |

* cited by examiner

*Primary Examiner* — Nicholas P D'Aniello

(74) *Attorney, Agent, or Firm* — Dickinson Wright, PLLC

(57) ABSTRACT

A cell module includes: a cylindrical cell; a fixing member having a through-hole in which one end of the cylindrical cell is held; and a solidified adhesive bonding together the cylindrical cell and the fixing member. The through-hole has an outer part and an inner part. A shape of the outer part is partially enlarged compared with a shape of the inner part so as to form a liquid pocket, and matches the shape of the inner part on the side opposite from the liquid pocket. Relative to the fixing member, the cylindrical cell is held in an inclined state, such that another end of the cylindrical cell is located closer to the liquid pocket side than the one end of the cylindrical cell is.

5 Claims, 6 Drawing Sheets

CELL MODULE

INCORPORATION BY REFERENCE

This application claims priority to Japanese Patent Application No. 2016-032471, filed on Feb. 23, 2016, including the specification, drawings and abstract, the entire disclosure of which is incorporated herein by reference.

BACKGROUND

1. Technical Field

The present disclosure relates to a cell module with cells fixed to a fixing member. More particularly, the disclosure relates to a cell module in which the cells are cylindrical cells and these cylindrical cells are fixed to the fixing member with an adhesive.

2. Description of Related Art

Examples of cell modules include one described in Japanese Patent Application Publication No. 2012-221844. FIG. 5 of this publication shows a cell module 100b (referred to therein as a "cell block"). The cell module 100b has cylindrical cells 140 ("lithium ion cells"). FIG. 5 further shows a fixing member 130 ("side plate"). The fixing member 130 has through-holes 132. According to the technique described in JP 2012-221844 A, the cylindrical cells 140 are mounted in the through-holes 132 of the fixing member 130. The cylindrical cells 140 and the fixing member 130 are bonded together with an adhesive (see, for example, paragraph [0067] etc. of JP 2012-221844 A).

SUMMARY

One disadvantage associated with the above described conventional technique is the spillage of adhesive. Although not directly mentioned in JP 2012-221844 A, when mounting the cylindrical cells 140 to the fixing member 130, the cylindrical cells 140 are held in an upright position, and the fixing member 130 is placed so that the upper ends of the cylindrical cells 140 are fitted into the through-holes 132 of the fixing member 130. In this state, the adhesive is injected into the clearances between the cylindrical cells 140 and the through-hole 132 to bond the cylindrical cells 140. During this process, part of the injected adhesive passes through the fixing member 130 and spills downward. This causes a lack of the adhesive remaining between the cylindrical cell 140 and the wall surface of the through-hole 132. As a result, the bonding strength becomes insufficient, or an excessive amount of adhesive is required to compensate. Moreover, the adhesive spilling down makes a bond between the cylindrical cell 140 and another unintended member, or causes conduction failure of the cylindrical cell 140.

The present disclosure provides a cell module that is free of spillage of an adhesive during the process of bonding together the cylindrical cells and the fixing member.

A cell module according to an aspect of the present disclosure includes: a cylindrical cell; a fixing member having a through-hole in which one end of the cylindrical cell is held; and a solidified adhesive disposed in a clearance between a side surface of the cylindrical cell and a wall surface of the through-hole to bond together the cylindrical cell and the fixing member. The through-hole has an outer part that is a part on a side of the one end of the cylindrical cell in a thickness direction of the fixing member, and an inner part that is a part on a side of another end of the cylindrical cell in the thickness direction of the fixing member. Shapes of the outer part and the inner part are partially different from each other such that the through-hole has a stepped shape. The shape of the outer part is partially enlarged compared with the shape of the inner part so as to form a liquid pocket, and matches the shape of the inner part on a side opposite from the liquid pocket. Relative to the fixing member, the cylindrical cell is held in an inclined state, with an interval between the cylindrical cell and a wall surface of the inner part on a liquid pocket side being smaller than an interval between the cylindrical cell and the wall surface of the inner part on the side opposite from the liquid pocket, such that the other end of the cylindrical cell is located closer to the liquid pocket side than the one end of the cylindrical cell.

In the process of supplying an adhesive during manufacturing of the cell module according to an exemplary method, the cylindrical cell is located approximately at the center of the through-hole, without significant eccentricity, in a direction perpendicular to a direction connecting the liquid pocket side and the opposite side. The adhesive is supplied in this state. In this state, there is no large portion in the interval between the cylindrical cell and the wall surface of the through-hole in the vicinity of the liquid pocket where the adhesive is supplied. Thus, the adhesive supplied does not spill downward from the fixing member along the cylindrical cell.

The cell module according to an exemplary embodiment may further include a holding member located on the side of the other end of the cylindrical cell. The holding member may have a seat surface that comes in contact with an end face at the other end of the cylindrical cell, and the seat surface may have an inclined surface of which the liquid pocket side, in a direction connecting the liquid pocket side and the opposite side in the outer part of the fixing member, is located closer to the fixing member. This allows for greater stability of the cylindrical cell in its inclined position during the supply of the adhesive.

According to this configuration, a cell module is provided that is substantially free of spillage of the adhesive during the process of bonding together the cylindrical cells and the fixing member.

BRIEF DESCRIPTION OF THE DRAWINGS

Features, advantages, and technical and industrial significance of exemplary embodiments will be described below with reference to the accompanying drawings, in which like reference numerals denote like elements, features and structures, and wherein.

DETAILED DESCRIPTION OF EMBODIMENTS

Figure 1:
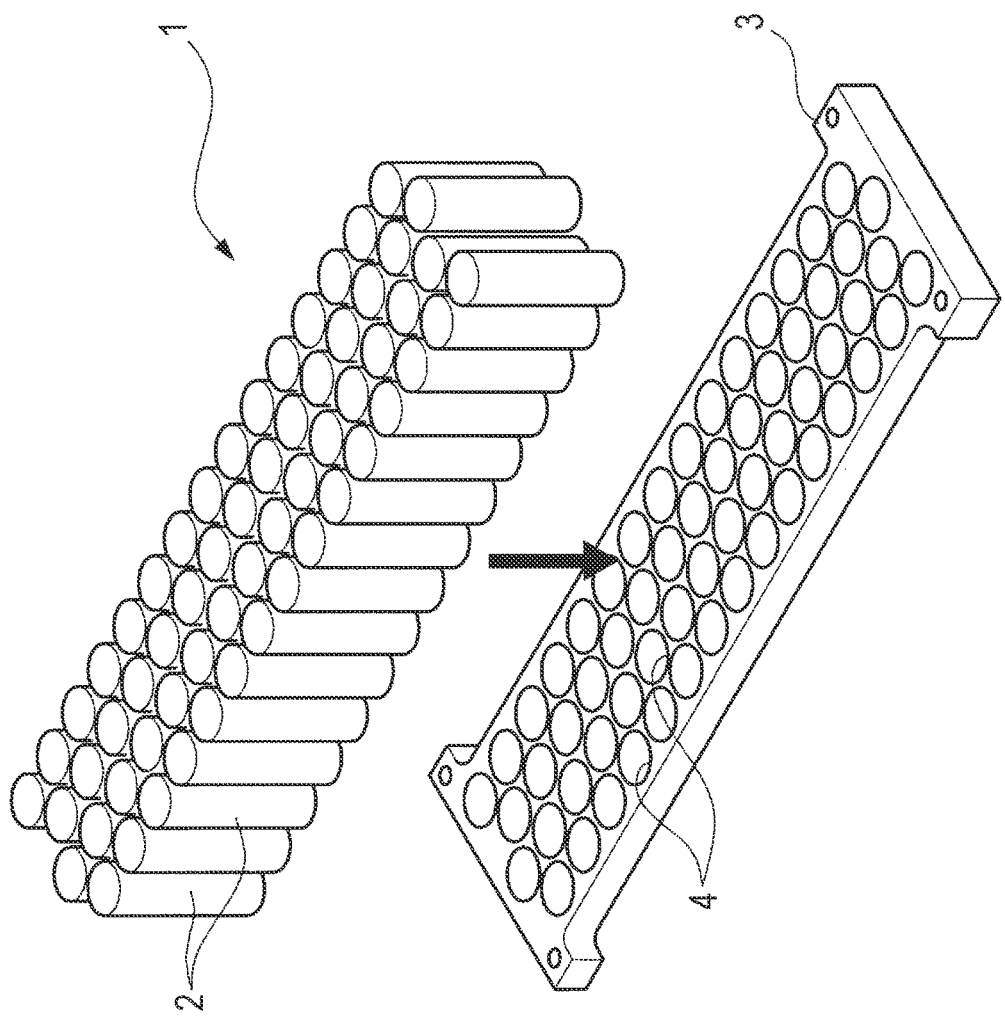
FIG. 1 is a perspective view showing cells and a fixing member of a cell module according to an exemplary embodiment.

An exemplary embodiment will be described in detail with reference to the accompanying drawings. A cell module 1 according to an exemplary embodiment is illustrated in FIG. 1, and comprises cylindrical cells 2 and a fixing member 3. The cylindrical cells 2 shown in FIG. 1 are preferably cylindrical cells with both end faces serving as external terminals. The large number of cylindrical cells 2 shown in FIG. 1 are preferably arranged so that adjacent cells have the positive and negative polarities in the opposite directions, which allows easy series connection. The fixing member 3 has a large number of through-holes 4 in which the cylindrical cells 2 are fixed.

Figure 2:
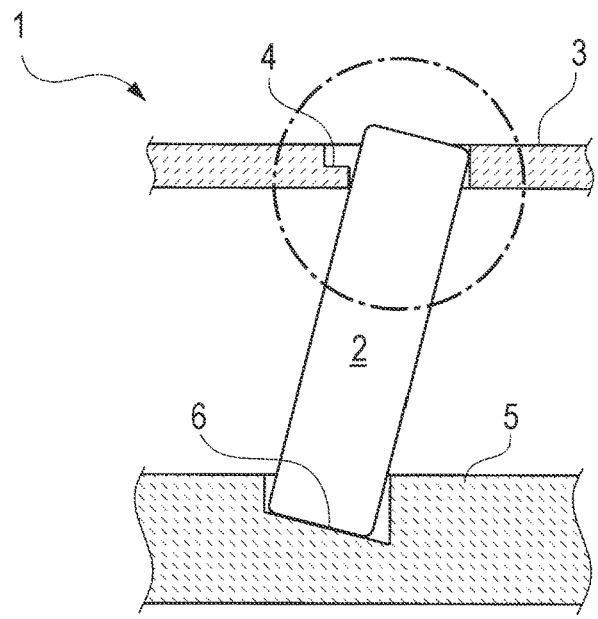
FIG. 2 is a sectional view of the cell module of the embodiment of FIG. 1.

As shown in FIG. 2, the cell module 1 has a holding member 5, other than the cylindrical cells 2 and the fixing member 3. The holding member 5 is a member that works with the fixing member 3 to hold the cylindrical cells 2. As shown in FIG. 2, the fixing member 3 fixes the upper end of the cylindrical cell 2, while the holding member 5 holds the lower end of the cylindrical cell 2. The holding member 5 has a recess 6 which receives the lower end of the cylindrical cell 2. It should be understood that FIG. 2 shows only a part of the cell module 1 corresponding to one cylindrical cell 2, but the holding member 5 has a large number of recesses 6 corresponding to the number of cylindrical cells 2. FIG. 1 shows the fixing member 3 as seen from the lower side of FIG. 2.

Figure 3:
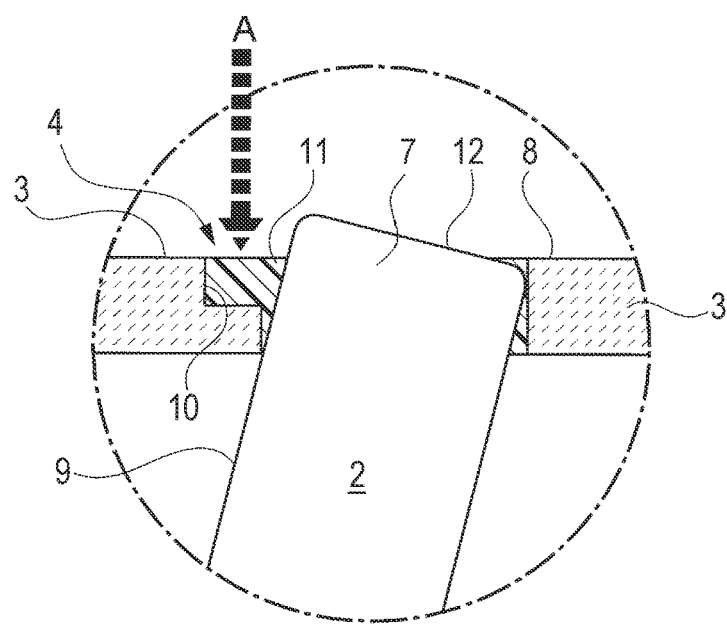
FIG. 3 is an enlarged sectional view showing main parts of the cell module of the embodiment of FIG. 1.

FIG. 3 is an enlarged view of the part where the cylindrical cell 2 is fixed by the fixing member 3. As shown in FIG. 3, an upper end portion 7 of the cylindrical cell 2 is inserted into the through-hole 4 of the fixing member 3. However, the cylindrical cell 2 protrudes only slightly upward beyond an upper surface 8 of the fixing member 3. An adhesive 11 is packed in a gap between a side surface 9 of the cylindrical cell 2 and a wall surface 10 of the through-hole 4. The cylindrical cell 2 is fixed to the fixing member 3 with the adhesive 11. The adhesive 11 is cured to a solidified state in the completed cell module 1. An upper end face 12 of the cylindrical cell 2 is preferably not covered with the adhesive 11.

As is clear from FIG. 2, the cylindrical cell 2 is disposed in the cell module 1 so as to not be perpendicular but slightly inclined relative to a plane of the fixing member 3 and the holding member 5. A bottom surface of the recess 6 is preferably formed with an inclined surface that matches the inclination of the cylindrical cell 2.

Figure 4:
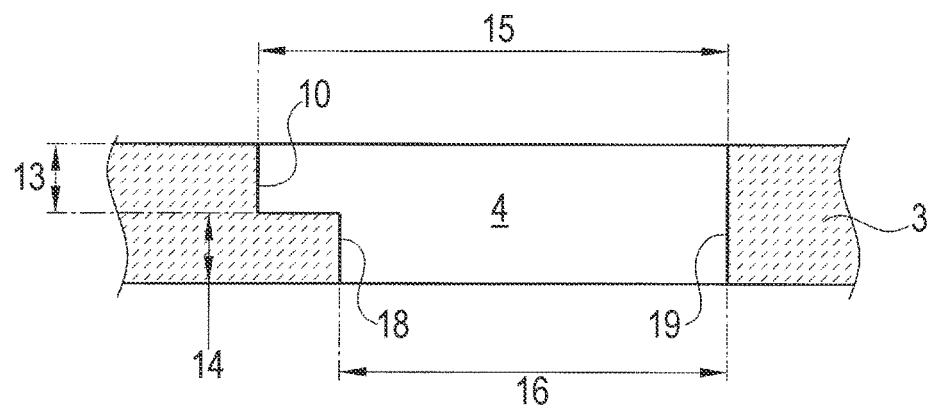
FIG. 4 is a sectional view showing the shape of a through-hole of the fixing member according to an exemplary embodiment.

The through-hole 4 of the fixing member 3 will now be described in detail. As shown in FIG. 4, the shape of the through-hole 4 in the fixing member 3 of this exemplary embodiment is different between an upper side (the side opposite from the holding member 5) 13 and a lower side (the side of the holding member 5) 14 in a thickness direction of the fixing member 3. Hereinafter, the part of the through-hole 4 on the upper side 13 and the part thereof on the lower side 14 will be referred to as an outer part 15 and an inner part 16, respectively.

Figure 5:
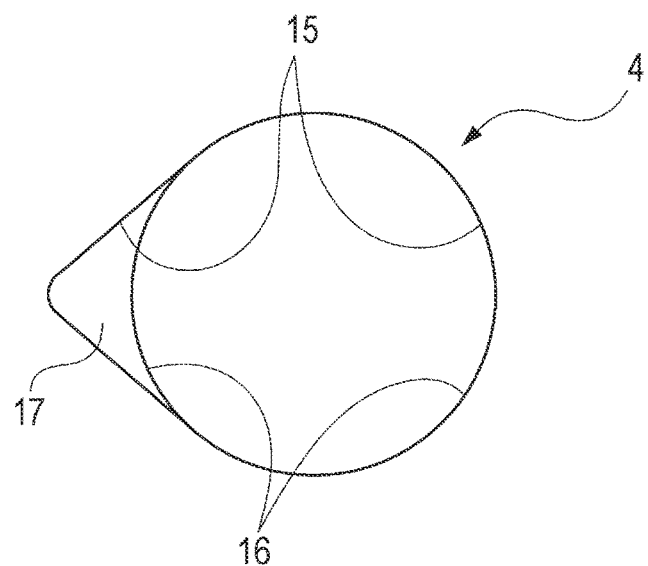
FIG. 5 is a plan view showing the shape of the through-hole of the fixing member according to an exemplary embodiment.

FIG. 5 is a plan view of the through-hole 4. In FIG. 5, the planar shape of the outer part 15 of the through-hole 4 and the planar shape of the inner part 16 of the through-hole 4 are shown in an overlapped state. The inner part 16 in FIG. 5 preferably has a circular shape. The size of the inner part 16 is slightly larger than the size of the circle defined by the cross-section of the cylindrical cell 2. On the other hand, the outer part 15 has a non-circular shape. Specifically, the outer part 15 has a shape that is partially enlarged on one side compared with the planar shape of the inner part 16. Hereinafter, the enlarged portion will be referred to as a liquid pocket 17. In FIG. 5, the liquid pocket 17 is located on the left side relative to the shape of the inner part 16. On the sides other than the side where the liquid pocket 17 is provided, the shape of the outer part 15 is preferably not enlarged compared with the shape of the inner part 16.

Figure 6:
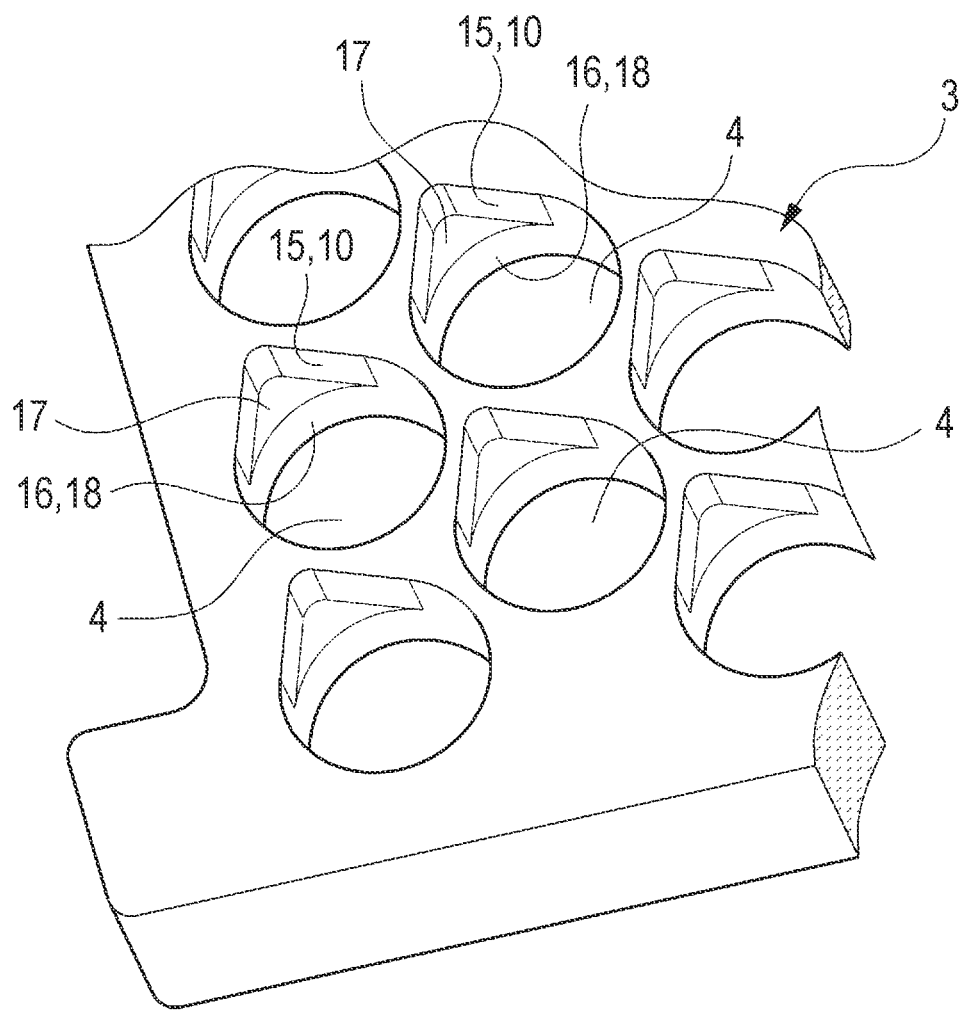
FIG. 6 is a perspective view showing the shape of the through-holes of the fixing member according to an exemplary embodiment.

Returning to FIG. 4, therefore, the wall surface 10 of the outer part 15 and a wall surface 18 of the inner part 16 form a stepped shape on the side (left side in FIG. 4) where the liquid pocket 17 is provided. On the other hand, on the side (right side in FIG. 4) where the liquid pocket 17 is not provided, the outer part 15 and the inner part 16 as a whole preferably form a straight wall surface 19, instead of such a stepped shape. Thus, the through-hole 4 has a partially stepped shape. FIG. 6 is a perspective view of a plurality of through-holes 4 in the fixing member 3.

Figure 7:
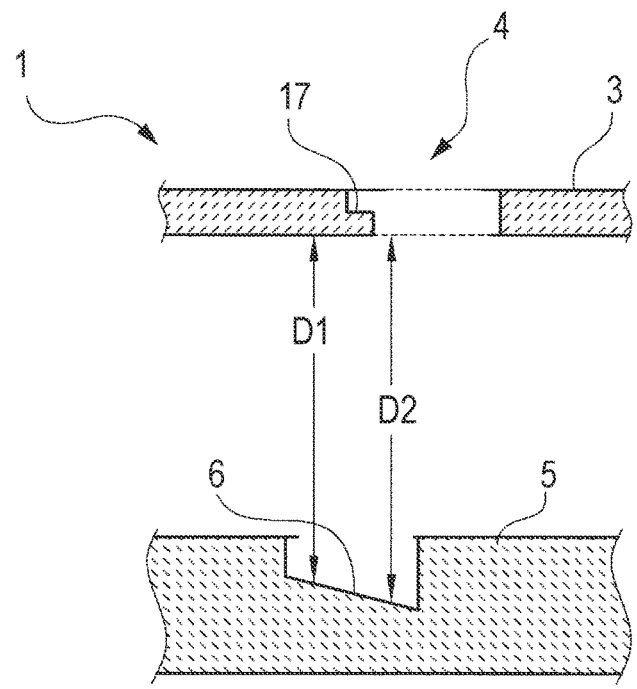
FIG. 7 is a sectional view similar to FIG. 2 except that the cylindrical cell is removed.

FIG. 7 is a view similar to FIG. 2 except that the cylindrical cell 2 is removed. In FIG. 7, arrows D1, D2 indicate distances between the bottom surface of the recess 6 and a lower surface of the fixing member 3 at two points inside the recess 6. The left-right direction in FIG. 7 is a direction connecting the side of the liquid pocket 17 and the opposite side in the through-hole 4 of the fixing member 3. To compare the point of the arrow D1 and the point of the arrow D2 with this direction, the point of the arrow D1 corresponds to the side of the liquid pocket 17 and the point of the arrow D2 corresponds to the opposite side. As shown in FIG. 7, the distance of the arrow D2 is longer than the distance of the arrow D1. This means that the bottom surface of the recess 6 is inclined so that, in the above direction, the side of the liquid pocket 17 of the bottom surface is located closer to the fixing member 3 and the opposite side thereof is located further away from the fixing member 3.

Accordingly, the cylindrical cell 2 is stabilized in the inclined state with the lower end supported in the recess 6 of the holding member 5 as shown in FIG. 2. In this state, the cylindrical cell 2 is inclined in such a direction that the side of the cylindrical cell 2 held in the holding member 5 is located closer to the side of the liquid pocket 17 than the side of the cylindrical cell 2 fixed to the fixing member 3 is.

Figure 8:
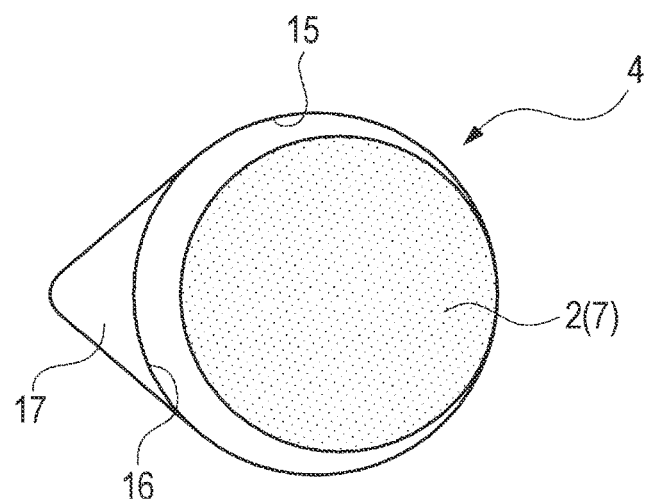
FIG. 8 is a plan view showing a first position of the cylindrical cell inside the through-hole.
Figure 9:
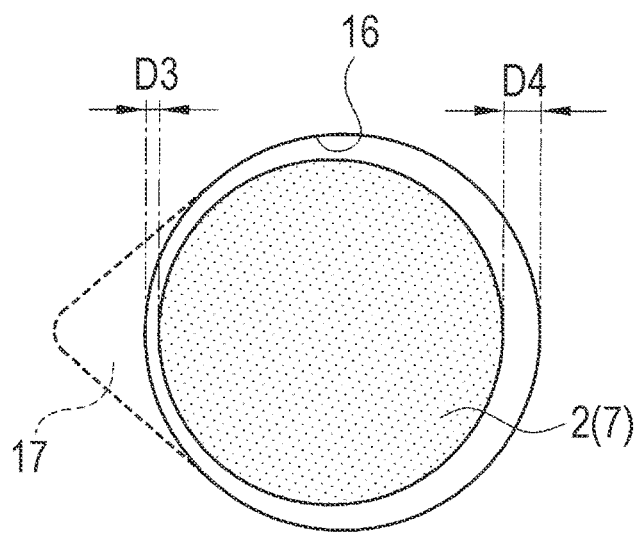
FIG. 9 is a plan view showing a second position of the cylindrical cell inside the through-hole.

As shown in FIG. 8, the upper end portion 7 of the cylindrical cell 2 thus inclined is located further on the side opposite from the liquid pocket 17 inside the outer part 15 (through-hole 4). Conversely, as shown in FIG. 9, the upper end portion 7 of the cylindrical cell 2 is located further on the side of the liquid pocket 17 inside the inner part 16. Thus, when a distance D3 and a distance D4 in FIG. 9 are compared, the distance D3 is smaller than the distance D4. The distance D3 is the interval between the cylindrical cell 2 and the wall surface of the inner part 16 on the side of the liquid pocket 17. The distance D4 is the interval between the cylindrical cell 2 and the wall surface of the inner part 16 on the side opposite from the liquid pocket 17.

The cylindrical cell 2 thus disposed is not significantly eccentric in the upper-lower direction in FIG. 8 as well as FIG. 9. That is, the cylindrical cell 2 is located inside the through-hole 4 approximately at the center in a direction perpendicular to the direction connecting the side of the liquid pocket 17 and the opposite side. Thus, in both FIG. 8 and FIG. 9, the interval between the cylindrical cell 2 and the wall surface of the through-hole 4 (inner part 16, outer part 15) on the upper side and that on the lower side are roughly symmetrical.

Thus configured, the cell module 1 of this embodiment offers the following advantages in the manufacturing of the cell module 1. Specifically, these advantages lie in the process of supplying an adhesive to the portion at which the cylindrical cell 2 and the fixing member 3 are bonded together. First, it is easy to supply the adhesive to the bonding portion. The adhesive is supplied at the location designated by arrow A in FIG. 3 to the portion of the liquid pocket 17 shown in FIG. 8. Here, according to an exemplary embodiment, the portion of the liquid pocket 17 shown in FIG. 8 is wide open as described above, which allows easy dripping of the adhesive. This is because the cylindrical cell 2 is located further on the side opposite from the liquid pocket 17 at the level of the outer part 15.

Another advantage is that spillage of the adhesive is less likely to occur. This is because the interval between the cylindrical cell 2 and the wall surface of the through-hole 4, particularly the inner part 16, on the upper side and that on the lower side in FIG. 8 and FIG. 9 are symmetrical as described above.

Figure 10:
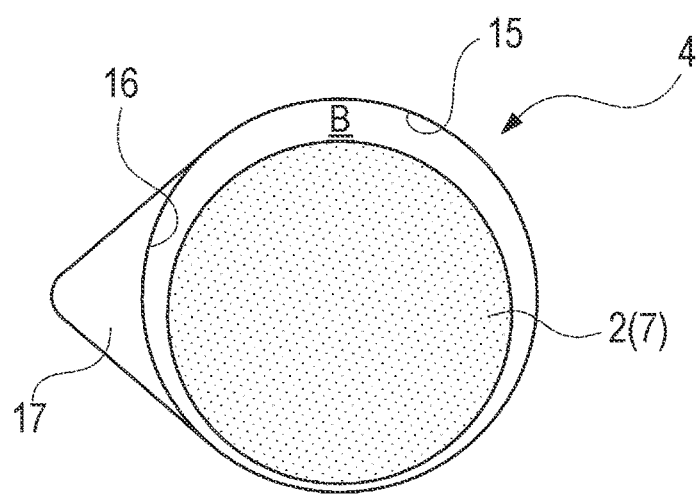
FIG. 10 is a plan view showing the position of a cylindrical cell inside a through-hole in an undesirable configuration avoided by exemplary embodiments of the invention.

To describe the reasons for the above, a case will be considered where the cylindrical cell 2 is inserted into the through-hole 4 of the fixing member 3 in an uninclined state. In this case, one cannot control on which side the cylindrical cell 2 will be eccentrically disposed inside the through-hole 4. The diameter of the through-hole 4 is necessarily somewhat larger than that of the cylindrical cell 2. Thus, a portion where the interval between the cylindrical cell 2 and the wall surface of the inner part 16 is large is created on one side of the through-hole 4. Suppose that the cylindrical cell 2 is located inside the through-hole 4 eccentrically in the direction perpendicular to the side of the liquid pocket 17 and the opposite side. Then, as shown in FIG. 10, a portion B where the interval between the cylindrical cell 2 and the wall surface of the inner part 16 is large is created in the vicinity of the liquid pocket 17. As a result, the adhesive spills downward from the fixing member 3 at the portion B, where the force of gravity exceeds the surface tension of the adhesive.

In exemplary embodiments configured as described above, by contrast, a portion where the interval between the cylindrical cell 2 and the wall surface of the inner part 16 is large is not present, at least in the vicinity of the liquid pocket 17. Accordingly, the force of gravity will typically not exceed the surface tension of the adhesive, and thus the adhesive will not spill downward from the fixing member 3. According to the above description of FIG. 9, the interval between the cylindrical cell 2 and the wall surface of the inner part 16 is slightly larger (distance D4) on the side opposite from the liquid pocket 17 in the inner part 16 that is the lower side of the fixing member 3. However, it is likely that the viscosity of the adhesive reaching this portion has already increased to some degree. This is because this portion is far away from the dripping portion (liquid pocket 17). Thus, all the same, spillage of the adhesive will not occur or will be minimal. Accordingly, spilled adhesive will not degrade the quality of the cell module 1. Moreover, the work of supplying the adhesive itself can be completed with just a single supply of the required amount of adhesive.

As has been described in detail above, according to an exemplary embodiment, the through-hole 4 of the fixing member 3 has a stepped shape, with the outer part 15 enlarged only on one side compared with the inner part 16 so as to form the liquid pocket 17. The adhesive is supplied in the state where the cylindrical cell 2 is inclined relative to the through-hole 4 so as to be located further on the side opposite from the liquid pocket 17 at the level of the outer part 15. Thus, spillage of the adhesive is prevented. Accordingly, a cell module 1 free of failure due to spillage of the adhesive is realized. Moreover, the bottom surface of the recess 6 of the holding member 5 is formed as an inclined surface, which increases stability of the cylindrical cell 2 in its inclined position.

The above described embodiment is merely an example and not intended to limit the present disclosure in any way. Thus, it goes without saying that various improvements and modifications can be made to the present disclosure without departing from the scope and spirit of the present invention. For example, the present disclosure is effective even when the number of the cylindrical cells 2 in the cell module 1 is one. In the case where there are a plurality of cylindrical cells 2, the form of connection (series connection, parallel connection) of the cylindrical cells 2 is arbitrary. It is not absolutely necessary to form the bottom surface of the recess 6 of the holding member 5 as an inclined surface. Simply adjusting the position of the recess 6 relative to the through-hole 4 can also realize the required inclination of the cylindrical cell 2.

What is claimed is:

1. A cell module, comprising:
   a cylindrical cell;
   a fixing member formed substantially in a plane, and having a through-hole in which one end of the cylindrical cell is received, the through-hole having an outer part that is a part on a side of the one end of the cylindrical cell in a thickness direction of the fixing member, and an inner part that is a part on a side of another end of the cylindrical cell in the thickness direction of the fixing member, a shape of the outer part and a shape of the inner part being partially different from each other such that the through-hole has a stepped shape, the shape of the outer part being partially enlarged compared with the shape of the inner part so as to form a liquid pocket, and substantially matching the shape of the inner part on a side opposite from the liquid pocket; and
   a solidified adhesive disposed in a clearance between a side surface of the cylindrical cell and a wall surface of the through-hole and bonding together the cylindrical cell and the fixing member, wherein
   the cylindrical cell is held in an inclined state relative to the plane of the fixing member, with an interval between the cylindrical cell and a wall surface of the inner part on a liquid pocket side being smaller than an interval between the cylindrical cell and the wall surface of the inner part on the side opposite from the liquid pocket, such that the other end of the cylindrical cell is located closer to the liquid pocket side than the one end of the cylindrical cell.

2. The cell module according to claim 1, further comprising a holding member located on the side of the other end of the cylindrical cell, wherein the cylindrical cell is disposed so as to be inclined relative to the plane of the fixing member and the holding member.

3. The cell module according to claim 1, further comprising a holding member located on the side of the other end of the cylindrical cell, wherein
   the holding member has a seat surface that comes in contact with an end face at the other end of the cylindrical cell, and the seat surface has an inclined surface of which the liquid pocket side, in a direction connecting the liquid pocket side and the opposite side in the outer part of the fixing member, is located closer to the fixing member.

4. The cell module according to claim 1, further comprising a holding member located on the side of the other end of the cylindrical cell, wherein the holding member has a seat surface that comes in contact with an end face at the other end of the cylindrical cell, and the seat surface is inclined such that a distance between the seat surface and the fixing member is shorter in a perpendicular direction from the liquid pocket side of the fixing member to the seat surface than in a perpendicular direction from the side of the fixing member opposite from the liquid pocket to the seat surface.

5. The cell module according to claim 1, wherein the cylindrical cell is located approximately at a center of the through-hole in a direction perpendicular to a direction connecting the liquid pocket and the opposite side.

* * * * *